United States Patent
Dailey et al.

(10) Patent No.: US 12,319,975 B2
(45) Date of Patent: Jun. 3, 2025

(54) MODULAR DIRECT REDUCTION SYSTEMS AND ASSOCIATED METHODS

(71) Applicant: Fluor Technologies Corporation, Irving, TX (US)

(72) Inventors: Jonathan M. Dailey, Durham (GB); Ray A. Corradi, Greenville, SC (US); Menko H. Ubbens, Heemstede (NL)

(73) Assignee: Fluor Technologies Corporation, Irving, TX (US)

( * ) Notice: Subject to any disclaimer, the term of this patent is extended or adjusted under 35 U.S.C. 154(b) by 708 days.

(21) Appl. No.: 17/697,850

(22) Filed: Mar. 17, 2022

(65) Prior Publication Data
US 2023/0295755 A1    Sep. 21, 2023

(51) Int. Cl.
| | | |
|---|---|---|
| *C21B 13/04* | (2006.01) | |
| *C01B 3/34* | (2006.01) | |
| *C21B 13/00* | (2006.01) | |
| *C21B 13/02* | (2006.01) | |
| *C21B 13/14* | (2006.01) | |

(52) U.S. Cl.
CPC .............. *C21B 13/04* (2013.01); *C01B 3/34* (2013.01); *C21B 13/0073* (2013.01); *C21B 13/02* (2013.01); *C21B 13/14* (2013.01); *C01B 2203/0205* (2013.01); *C01B 2203/0227* (2013.01); *C21B 2300/02* (2013.01)

(58) Field of Classification Search
CPC ..................................................... G06T 11/00
See application file for complete search history.

(56) References Cited

U.S. PATENT DOCUMENTS

| | | | |
|---|---|---|---|
| 9,039,794 B2* | 5/2015 | Crouch | .................... B01J 19/02 48/61 |
| 10,065,857 B2* | 9/2018 | Meissner | .............. C21B 13/026 |

FOREIGN PATENT DOCUMENTS

| | | | | |
|---|---|---|---|---|
| WO | WO-2023177407 A1 * | 9/2023 | ......... C21B 13/0073 |

\* cited by examiner

*Primary Examiner* — Natasha E Young
(74) *Attorney, Agent, or Firm* — James A. Hooper; Thaddeus J. Faleski; Conley Rose, P.C.

(57) ABSTRACT

A modular direct reduction system for producing direct reduced iron (DRI) includes a reformer system which receives a flow of feed gas and which discharges a flow of reducing gas, the reformer system including a plurality of separate reformer modules connected together and wherein each reformer module includes a reformer vessel including an internal chamber, a reactor tube extending through the internal chamber of the reformer vessel and containing a catalyst configured to react with the feed gas received by the reactor tube to form the reducing gas, and a burner to burn a fuel gas to heat the reactor tube, and a furnace system connected to the reformer system and including a furnace having a first inlet which receives an iron ore, a second inlet which receives the reducing gas from the reformer system to form the DRI, and an outlet which discharges the DRI.

20 Claims, 6 Drawing Sheets

MODULAR DIRECT REDUCTION SYSTEMS AND ASSOCIATED METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Direct reduced iron (DRI) refers to a metallic iron produced through the direct reduction of an iron bearing material, such as iron ore, into DRI accomplished through the removal of oxygen from the iron bearing material without melting the iron bearing material. DRI provides a reduced carbon-emission alternative to conventional coal fired blast furnaces. For example, direct reduction systems avoid the need of fueling a conventional coal fired blast furnace and thus are generally comparatively energy efficient compared to processes which rely on melting ore to provide metallic iron. The reduction of iron in the iron bearing material provided by DRI production processes may be accomplished via the introduction of a reducing agent such as a reducing gas including, for example, a reformed natural gas. In some applications, the reducing gas yields carbon monoxide and hydrogen which react with the iron bearing material within a gas-based furnace to reduce the oxygen content thereof and thereby form the DRI product.

BRIEF SUMMARY OF THE DISCLOSURE

An embodiment of a modular direct reduction system for producing direct reduced iron (DRI) comprises a reformer system which receives a flow of feed gas along a feed gas flowpath and which discharges a flow of reducing gas along a reducing gas flowpath, the reformer system comprising a plurality of separate reformer modules connected together and wherein each reformer module comprises a reformer vessel comprising an internal chamber, a reactor tube extending through the internal chamber of the reformer vessel and containing a catalyst configured to react with the feed gas received by the reactor tube to form the reducing gas, and a burner which receives a flow of fuel gas along a fuel gas flowpath and is configured to burn the fuel gas to heat the reactor tube, a furnace system connected to the reformer system and comprising a furnace having a first inlet which receives an iron ore, a second inlet which receives the reducing gas from the reformer system to react with the iron ore and form the DRI, and an outlet which discharges the DRI. In some embodiments, each of the plurality of separate reformer modules are truckable. In some embodiments, each of the plurality of separate reformer modules has a size equal to or less than an intermodal standardized shipping container. In certain embodiments, the system comprises a feed gas header connected to each of the plurality of separate reformer modules, wherein the feed gas flowpath extends through the feed gas header, and a reducing gas header connected to each of the plurality of separate reformer modules, wherein the reducing gas flowpath extends through the reducing gas header. In certain embodiments, the feed gas comprises a pre-heated feed gas and the feed gas flowpath comprises a pre-heated feed gas flowpath, and the system further comprises a heat recovery system which receives a flow of raw feed gas along a raw feed gas flowpath and which discharges a flow of the pre-heated feed gas along the pre-heated feed gas flowpath, the heat recovery system comprising a plurality of separate heat recovery modules connected together and wherein each heat recovery module comprises a heat recovery vessel comprising an internal chamber, a first fluid conduit extending through the internal chamber of the heat recovery vessel, wherein the first fluid conduit receives the flow of raw feed gas and discharges the flow of pre-heated feed gas, and a second fluid conduit extending through the internal chamber of the heat recovery vessel, wherein the second fluid conduit receives a flow of flue gas from the reformer system to heat the raw feed gas received by the first fluid conduit. In some embodiments, each of the plurality of separate heat recovery modules are truckable. In certain embodiments, each of the plurality of separate heat recovery modules has a size equal to or less than an intermodal standardized shipping container. In certain embodiments, the system comprises a raw feed gas header connected to each of the plurality of separate heat recovery modules, wherein a raw feed gas flowpath extends through the raw feed gas header, and a pre-heated feed gas header connected to each of the plurality of separate heat recovery modules, wherein a pre-heated feed gas flowpath extends through the pre-heated feed gas header.

An embodiment of a method for providing a direct reduction system to produce direct reduced iron (DRI) comprises (a) determining a number of pre-fabricated reformer modules of the direct reduction system required to provide the direct reduction system with a desired DRI output capacity, (b) transporting the determined number of pre-fabricated reformer modules from an off-site location to a site of the direct reduction system, (c) connecting the determined number of pre-fabricated reformer modules together to form a reformer system of the direct reduction system, wherein the reformer system is configured to convert a feed gas received by the reformer system into a reducing gas discharged by the reformer system, and (d) connecting the reformer system to a furnace system of the direct reduction system at the site of the direct reduction system, wherein the furnace system is configured to convert an iron ore received by the furnace system into the DRI using the reducing gas discharged by the reformer system. In some embodiments, (b) comprises road-transporting the determined number of pre-fabricated reformer modules to the site of the direct reduction system. In some embodiments, (b) comprises water-transporting the determined number of pre-fabricated reformer modules to the site of the direct reduction system. In certain embodiments, each of the pre-fabricated reformer modules comprises a vessel comprising an internal chamber, a reactor tube extending through the internal chamber of the vessel and containing a catalyst configured to react with the feed gas received by the reactor tube to form the reducing gas, and a burner which receives a flow of fuel gas along a fuel gas flowpath and is configured to burn the fuel gas to heat the reactor tube. In some embodiments, at least some of the determined number of pre-fabricated reformer modules are connected together to form a reformer very large module (VLM) prior to transporting the reformer VLM to the site of the direct reduction system. In some embodiments, the method comprises (e) determining a number of pre-fabricated heat recovery modules of the direct reduction system required to provide the direct reduction system with the desired DRI output capacity, (f) transporting the determined number of pre-fabricated heat recovery modules to the site of the direct reduction system, and (g) connecting the determined number of pre-fabricated heat recovery modules together to form a heat recovery system of the direct reduction system, wherein the heat recovery system is configured to heat the feed gas using a flue gas discharged by the reformer system before the feed gas is received by the reformer system. In certain embodiments, (f) comprises road-transporting the determined number of pre-fabricated heat recovery modules to the site of the direct reduction system. In certain embodiments, each of the pre-fabricated reformer modules comprises a heat recovery vessel comprising an internal chamber, a first fluid conduit extending through the internal chamber of the heat recovery vessel, wherein the first fluid conduit receives the feed gas heated by the heat recovery module, and a second fluid conduit extending through the internal chamber of the heat recovery vessel, wherein the second fluid conduit receives a flue gas from the reformer system to heat the feed gas received by the first fluid conduit.

An embodiment of a method for providing a direct reduction system to produce direct reduced iron (DRI) comprising (a) fabricating a plurality of separate reformer modules at an off-site location, each of the plurality of separate reformer modules comprising a vessel comprising an internal chamber, a reactor tube extending through the internal chamber of the vessel and containing a catalyst configured to react with a feed gas received by the reactor tube to form a reducing gas, and a burner which receives a flow of fuel gas along a fuel gas flowpath and is configured to burn the fuel gas to heat the reactor tube, (b) transporting at least some of the fabricated reformer modules to a site of the direct reduction system, (c) connecting the transported reformer modules together to form a reformer system of the direct reduction system, wherein the reformer system is configured to convert a feed gas received by the reformer system into a reducing gas discharged by the reformer system, and (d) connecting the reformer system to a furnace system of the direct reduction system at the site of the direct reduction system, wherein the furnace system is configured to convert an iron ore received by the furnace system into the DRI using the reducing gas discharged by the reformer system. In some embodiments, the method comprises (e) determining a number of the reformer modules of the direct reduction system required to provide the direct reduction system with a desired DRI output capacity, wherein the number of reformer modules transported to the site of the direct reduction system is equal to the number of reformer modules determined at (e). In some embodiments, the method comprises (e) fabricating a plurality of separate heat recovery modules at an off-site location, each of the plurality of separate heat recovery modules comprising a heat recovery vessel comprising an internal chamber, a first fluid conduit extending through the internal chamber of the heat recovery vessel, wherein the first fluid conduit receives the feed gas heated by the heat recovery module, and a second fluid conduit extending through the internal chamber of the heat recovery vessel, wherein the second fluid conduit receives a flue gas from the reformer system to heat the feed gas received by the first fluid conduit, (f) transporting at least some of the fabricated heat recovery modules to the site of the direct reduction system, and (g) connecting a heat recovery system comprising the plurality of separate heat recovery modules to the reformer system of the direct reduction system at the site of the direct reduction system, wherein the heat recovery system heats the feed gas received by the reformer system using a flue gas discharged by the reformer system. In certain embodiments, the method comprises (h) determining a number of the heat recovery modules of the direct reduction system required to provide the direct reduction system with a desired DRI output capacity, wherein the number of heat recovery modules transported to the site of the direct reduction system is equal to the number of heat recovery modules determined at (h).

BRIEF DESCRIPTION OF THE DRAWINGS

For a detailed description of various exemplary embodiments, reference will now be made to the accompanying drawings in which.

DETAILED DESCRIPTION

Figure 1:
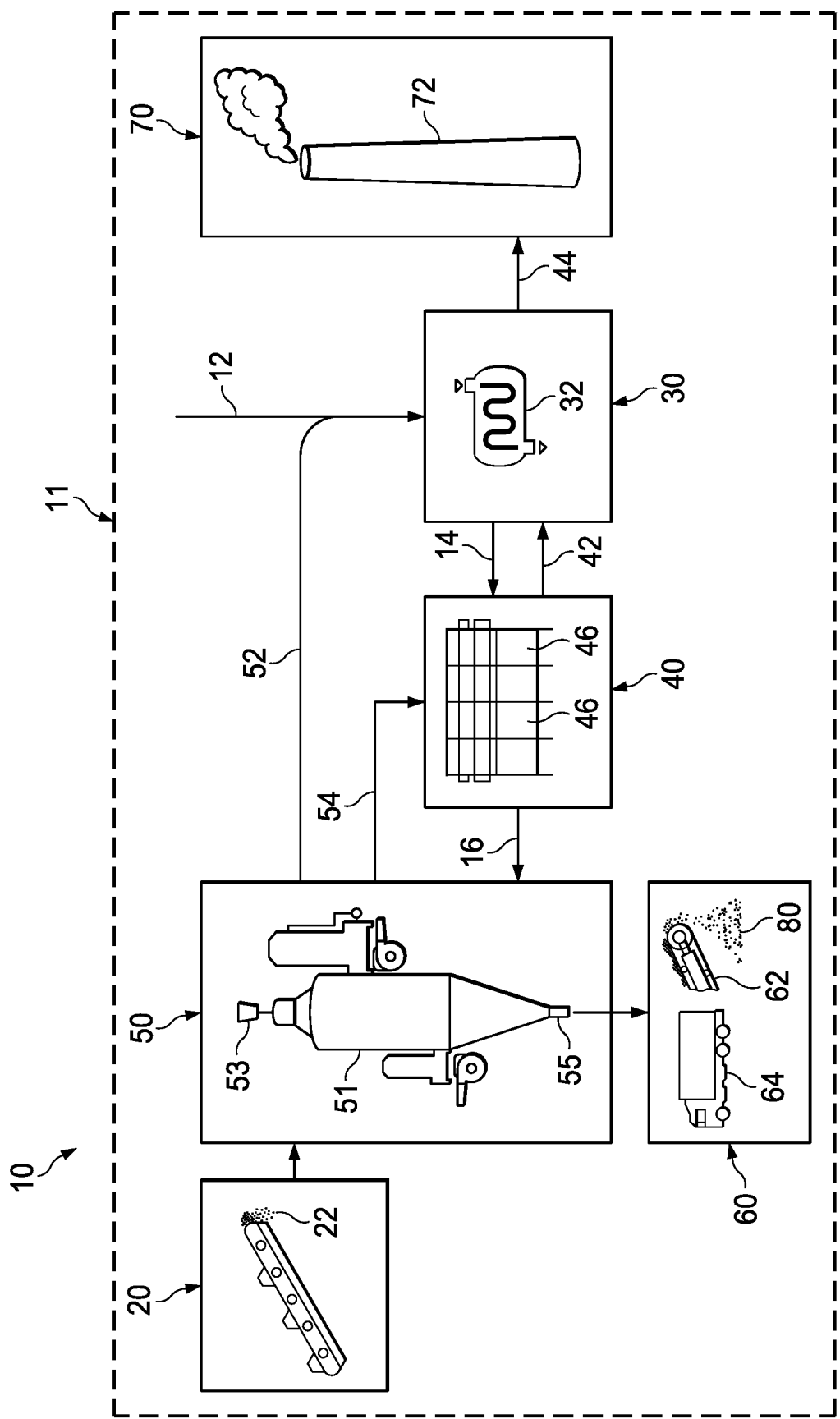
FIG. 1 is a schematic illustration of an embodiment of a modular direct reduction system.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As previously described, direct reduction processes used to produce DRI are generally more fuel efficient and have reduced carbon emissions relative to processes which form metallic iron using conventional coal fired blast furnaces designed to melt a feed ore, making direct reduction processes and the DRI produced therefrom an attractive option for producing metallic iron. Also, as previously described, some direct reduction processes utilize a reducing gas to reduce the oxygen content of a feed ore (e.g., an iron ore pellets and/or a lump ore) within a gas-based furnace to form the DRI product.

For example, gas-based direct reduction systems designed to produce a DRI product may generally include a feed transport system for conveying a feed ore such as iron ore pellets and/or lump ore, a furnace or reactor system in which the feed ore is reacted with a reducing gas to form the DRI product, a reformer system which "reforms" a feed gas of the direct reduction system into the reducing gas supplied to the furnace system, a heat recovery system which recovers heat from a flue gas of the direct reduction system (e.g., a flue gas of the reformer system) and transfers this recovered heat to the feed gas to enhance the thermal efficiency of the direct reduction system, and an exhaust system which ultimately exhausts the flue gas of the direct reduction system.

While direct reduction systems, including gas-based direct reduction systems, offer significant advantages in terms of reduced carbon emissions and fuel consumption compared to conventional coal fired furnace systems, in at least some applications coal fired furnace systems may yet be preferred over direct reduction systems due to comparatively great capital costs of direct reduction systems relative to conventional coal fired furnace systems. To state in other words, in at least some applications the costs associated with fabricating and assembling direct reduction systems are significantly greater than the capital costs associated with fabricating and assembling coal fired furnace systems, making the relatively lower emission and energy efficient direct reduction system uncompetitive in at least some instances.

Conventionally, direct reduction systems utilized for producing DRI are tailored to a single, specific application. Particularly, a proposed direct reduction system may require a predetermined output capacity or capacity range of DRI to be produced per year which may be measured in, for example, million tons produced per year (Mtpy). With the predetermined output capacity of the proposed direct reduction system known, components of the direct reduction system are typically fabricated in a "stick-build" arrangement on-site at the location of the proposed direct reduction system. Particularly, at least some of the components of the proposed direct reduction system including, for example, the feed transport, furnace, reformer, heat recovery, and/or exhaust systems are fabricated specifically for the specific requirements of the proposed direct reduction system, including, for example, the predetermined output capacity of the direct reduction system. In other words, the feed transport, furnace, reformer, heat recovery, and/or exhaust systems are sized, configured, and/or otherwise tailored to the specific requirements of the proposed direct reduction system when fabricated on-site.

Fabricating the components of the direct reduction system (e.g., the feed transport, furnace, reformer, heat recovery, and/or exhaust systems, etc.) on-site may be relatively more expensive than fabricating these components in one or more off-site facilities designed for the fabrication of such components, thereby increasing the overall capital costs associated with fabricating and assembling the direct reduction system. However, the components of the direct reduction system may be too large and/or cumbersome to transport from an off-site fabrication facility to the on-site location of the proposed direct reduction system, leaving no choice but to assemble the components on-site even if doing so increases the capital costs associated with the proposed direct reduction system.

Additionally, the components of the direct reduction system (e.g., the feed transport, furnace, reformer, heat recovery, and/or exhaust systems, etc.) cannot be reused at a future direct reduction system once operation of the initial direct reduction system for which the components have been fabricated has ceased. Thus, the components fabricated for the proposed direct reduction system are single-use given that their fabrication is tailored specifically to the requirements of the proposed direct reduction system. Given that the components of the direct reduction system are single-use, the capital costs associated with fabricating the components cannot be mitigated by reusing the components in multiple successive direct reduction systems following the completion of operation of each successive direct reduction systems.

As described above, the requirement of fabricating components of the direct reduction system (e.g., the feed transport, furnace, reformer, heat recovery, and/or exhaust systems, etc.) on-site, and the inability to reuse the components of the direct reduction system in multiple direct reduction systems prevent a reduction in capital costs associated with fabricating and assembling direct reduction systems which could otherwise make such systems more competitive in terms of capital costs with the less energy efficient and environmentally friendly coal fired furnace systems.

Accordingly, embodiments of modular direct reduction systems and associated methods are described herein which address at least some of the issues of direct reduced systems described above. Particularly, embodiments of modular direct reduction systems are described herein which include one or more systems formed from one or more pre-fabricated, transportable modules. The one or more modules comprise self-supporting structures which may be fabricated at one or more off-site locations and then transported to the site of the direct reduction system in a pre-fabricated state. The one or more modules may include an external support structure, process piping, fixed and/or rotating equipment (e.g., vessels, pumps, compressors, etc.), electrical equipment, etc. The off-site locations may comprise one or more fabrication facilities configured for the fabrication of the modules such that capital costs associated with fabricating the modules are reduced relative to manufacturing the modules on-site at the location of the direct reduction system. For example, the one or more modules may be road-transported via one or more trucks, water-transported via one or more vessels or ships, or rail-transported via one or more trains. The modules themselves are not individually configured for any particular direct reduction system, and thus may be reused in a plurality of differently configured direct reduction systems, such as multiple direct reduction systems having different DRI output capacities. Fabricating the modules off-site may also reduce the number of on-site personnel, further reducing costs while also increasing safety at the site of the direct reduction facility.

In some embodiments, the pre-fabricated modules of the modular direct reduction system include reformer modules used to react feed gas (e.g., natural gas, etc.) with a catalyst to form a reducing gas which may, in-turn, be reacted with iron ore in a furnace system of the direct reduction system to form the DRI. Pre-fabricated modules of the modular direct reduction system may also include heat recovery modules used to recover heat from the reformer modules by pre-heating the feed gas before it is supplied to the reformer modules, thereby enhancing the thermal efficiency of the direct reduction system.

Referring now to FIG. 1, an embodiment of a modular direct reduction system 10 for producing a DRI 80 product is shown. Direct reduction system 10 is shown in FIG. 1 in an assembled state at a site 11 at which the direct reduction system 10 is operated to produce DRI 80. In this exemplary embodiment, direct reduction system 10 generally includes a feed or ore transport system 20, a heat recovery system 30, a reformer system 40, a furnace or reactor system 50, a product transport system 60, and an exhaust system 70. It may be understood that direct reduction system 10 may include additional components not shown in FIG. 1, and that, in other embodiments, direct reduction system 10 may not include one or more of the components shown in FIG. 1.

The feed transport system 20 of direct reduction system 10 transports a supply of iron bearing material or iron ore 22 to the furnace 50 of direct reduction system 10. In this exemplary embodiment, feed transport system 20 includes a conveyor 24 (e.g., a direct or gear driven conveyor) along which the iron ore 22 is deposited and conveyed vertically upwards towards the furnace system 50. In some embodiments, the iron ore 22, which may comprise iron ore pellets, lump ore, etc., is trucked to the site 11 and deposited onto the conveyor 24 from the trucks used to transport the iron ore 22. It may be understood that in other embodiments the feed transport system 20 may comprise mechanisms other than conveyor 24 for supplying the furnace system 50 with iron ore 22.

The heat recovery system 30 of direct reduction system 10 receives a flow of feed gas 12 and a flue gas 42 from the reformer system 40 whereby heat from the flue gas 42 is transferred to the feed gas 12. In this exemplary embodiment, heat recovery system 30 also receives an exhaust or "top" gas 52 recirculated from the furnace system 50 and which may mix with the feed gas 12. In some embodiments, the exhaust gas 52 may be cleaned by a scrubber (e.g., a wet scrubber) prior to mixing with the feed gas 12. Additionally, in this exemplary embodiment, feed gas 12 comprises natural gas; however, it may be understood that in other embodiments feed gas 12 may comprise gasses other than, or in addition to, natural gas. Heat recovery system 30 transfers heat from the flue gas 42 to the feed gas 12 and outputs a pre-heated feed gas 14 which flows from the heat recovery system 30 to the reformer system 40, and a cooled flue gas 44 which flows from the heat recovery system 30 to the exhaust system 70. In this manner, the thermal efficiency of direct reduction system 10 may be maximized by transferring heat from the hot flue gas 42 to the feed gas 12 rather than letting this heat go to waste in the exhaust system 70.

The reformer system 40 of direct reduction system 10 receives the pre-heated feed gas 14 from heat recovery system 30 and reforms the pre-heated feed gas 14 into a reducing agent or gas 16 that flows from the reformer system 40 into the furnace system 50. In this exemplary embodiment, the reducing gas 16 comprises carbon monoxide (CO) and hydrogen (H2). For example, in some embodiments, reducing gas 16 may comprise 90% or more of (CO+H2); however, it may be understood that the composition of reducing gas 16 may vary in other embodiments. Additionally, in this exemplary embodiment, reducing gas 16 is formed by one or more catalyst filled tubes which are heated by the burning of a fuel gas 54 supplied from the furnace system 50. In this manner, the CO and H2 products comprising reducing gas 16 are formed through the catalytic reactions which occur to the pre-heated feed gas 14 as it flows through the reformer system 40.

The furnace system 50 reacts the reducing gas 16 supplied by reformer system 40 with the iron ore 22 supplied by feed transport system 20 whereby an oxygen content of the iron ore 22 is reduced to thereby form DRI 80. While the iron ore 22 is heated by furnace system 50, DRI 80 is formed by furnace system 50 without melting iron ore 22 as the iron ore 22 passes through furnace system 50. In this exemplary embodiment, furnace system 50 comprises a shaft furnace 51 having a vertically upper end 53 and a vertically lower end 55 opposite upper end 53. Iron ore 22 is introduced to the shaft furnace 51 at the upper end 53 thereof. For example, iron ore 22 may be introduced into the shaft furnace 51 via a hopper located at the upper end 53 of the shaft furnace 51. The iron ore 22 descends by gravity vertically downwards through the shaft furnace 51. The reducing gas 16 enters the shaft furnace 51 at a location vertically below the upper end 53 and flows vertically upwards through the shaft furnace 51 in a counter-flow arrangement, contacting and heating the iron ore 22 as the iron ore 22 descends through the shaft furnace 51. As the reducing gas 16 contacts the iron ore 22, the CO and H2 components of the reducing gas 16 react with iron oxide (Fe2O3) of the iron ore 22 to remove O2 therefrom leaving DRI 80 which comprises elemental iron (Fe).

The reducing gas 16 flowing upwards through shaft furnace 51 exits the furnace 51 at the upper end 53 thereof as exhaust gas 52 which is recirculated to the heat recovery system 30 as described above. The formed DRI 80 exits the shaft furnace 51 at the lower end 55 thereof where DRI 80 is thereby fed to the product transport system 60 of direct reduction system 10. It may be understood that in some embodiments, DRI 80 may undergo additional processing prior to being supplied to product transport system 60. For example, in some embodiments, DRI 80 is cooled and carburized (e.g., by a cooling gas supplied to shaft furnace 51) to form cold DRI (CDRI). In other embodiments, DRI 80 may be supplied to a briquetting machine to produce hot briquetted iron (HBI).

The product transport system 60 of direct reduction system 10 transports DRI 80 (and/or CDRI, HBI, etc.,) to a recipient distal the site 11 such as, for example, a consumer or other end-user. In this exemplary embodiment, product transport system 60 generally includes a product conveyor 62 to convey the DRI 80 from the furnace system 50 and one or more trucks 64 for transporting DRI 80 to one or more recipients of DRI 80. It may be understood that the configuration of product transport system 60 may vary in other embodiments. Additionally, exhaust system 70 of direct reduction system 10 includes an exhaust or ejector stack 72 which receives the cooled flue gas 44 from the heat recovery system 30 and exhausts the cooled flue gas 44.

Direct reduction system 10, and at least some of the systems comprising system 10, are specifically configured to produce DRI 80 at a particular, predefined output capacity or capacity band (e.g., an output capacity of 2.2 Mtpy of DRI 80, for example). For example, the heat recovery system 30, reformer system 40, and/or heater system 50 of direct reduction system 10 may be configured to produce the predefined output capacity of DRI 80. However, at least some of the systems comprising direct reduction system 10 are modularized whereby the given system is formed from one or more generic modules, where the modules forming the particular system are not themselves specifically configured to produce a given output capacity of DRI 80. Particularly, in this exemplary embodiment, heat recovery system 30 comprises one or more heat recovery modules 32 and reformer system 40 comprises one or more reformer modules 46. Heat recovery modules 32 may be identically configured to each other, and reformer modules 46 may be identically configured to each other. One or more heat recovery modules 32 may be connected in series and/or in parallel with each other to form the heat recovery system 30 while one or more reformer modules 46 may be connected in series and/or parallel with each other to form reformer system 40.

In this exemplary embodiment, the heat recovery system 30 and reformer system 40 are configured to produce the desired output capacity of DRI 80 through the selection of the appropriate number of heat recovery modules 32 and reformer modules 46, respectively, instead of fabricating systems 30, 40 on-site at the site 11 of system 10. For instance, a first desired output capacity of direct reduction system 10 may correspond to a first number of heat recovery modules 32 and a first number of reformer modules 46 (which may be different in number than the number of modules 32), while a second desired output capacity of system 10 may correspond to a second number of heat recovery modules 32 (different in number than the first number of modules 32) and a second number of reformer modules 46 (different in number than the first number of modules 46). The desired configuration of direct reduction system 10 may thus be achieved, at least in part, by varying the number of generic heat recovery modules 32 and reformer modules 46.

In this exemplary embodiment, both the heat recovery modules 32 and reformer modules 46 are fabricated at one or more sites distal the site 11 of direct reduction system 10. For example, heat recovery modules 32 and reformer modules 46 may be fabricated at one or more fabrication facilities configured specifically for fabricating recovery modules 32 and reformer modules 46. The ability to fabricate heat recovery modules 32 and reformer modules 46 which form the heat recovery system 30 and reformer system 40, respectively, at fabrication facilities rather than at the site 11 of direct reduction system 10 itself may reduce the time and capital costs associated with fabricating systems 30, 40 given that, generally, it is more convenient and less expensive to fabricate modules 32, 46 at specialized fabrication facilities configured and staffed to fabricate modules 32, 46 than in the field at site 11 where such facilities are nonexistent. The reduction in capital costs associated with the fabrication of heat recovery system 30 and reformer system 40 of course results in a reduction in the overall capital costs associated with providing direct reduction system 10.

Instead of fabricating heat recovery modules 32 and reformer modules 46 on-site at the site 11, modules 32, 46 are transported to the site 11 of direct reduction system 10 in a pre-fabricated form. For example, heat recovery modules 32 and reformer modules 46 may be transported from one or more facilities at which the modules 32, 46 were originally fabricated to the site 11 to be assembled into heat recovery system 30 and reformer system 40, respectively. In another example, heat recovery modules 32 and reformer modules 46 may be transported to site 11 from the site of another direct reduction system and/or from a facility at which modules 32, 46 have been refurbished following service in a previous direct reduction system. Particularly, given that heat recovery modules 32 and reformer modules 46 are generic in design and are not configured specifically for the needs and requirements of direct reduction system 10, modules 32, 46 may be reused in multiple direct reduction systems (and/or other systems in some embodiments). The reusability of heat recovery modules 32 and reformer modules 46 further reduces the capital costs associated with forming heat recovery system 30 and reformer system 40 (as well as other heat recovery and reformer systems utilizing the modules 32, 46, respectively) by spreading the cost associated with fabricating a given module 32, 46 across multiple direct reduction systems, thereby minimizing the capital costs associated with forming each of the multiple direct reduction systems.

In this exemplary embodiment, heat recovery modules 32 and/or reformer modules 46 are truckable and thus may be road-transported to the site 11 by one or more motor vehicles or trucks. As used herein, the term "truckable" means modules 32 and/or 46 have a size, shape, and weight suitable for transport with a semi-trailer truck on commercial roadways. Thus, the modules 32 and/or 46 may be similar in dimensions with intermodal or large standardized shipping containers to facilitate truck transport on commercial roadways.

As an example, in some embodiments, site 11 of direct reduction system 10 is located in-land at a location which it is not feasible to deliver heat recovery modules 32 and reformer modules 46 directly from a ship, and instead modules 32, 46 must be trucked to the location of site 11. Given that heat recovery modules 32 and reformer modules 46 are configured in this exemplary embodiment to be truckable and road-transportable, modules 32, 46 cannot exceed a predefined size and/or weight (which may vary by region) associated with road-transportability. For instance, some jurisdictions may have maximum size and/or weight restrictions for loads transportable along roads of the given jurisdiction which heat recovery modules 32 and reformer modules 46 may not exceed to ensure their road transportability in the given jurisdiction. The size of truckable modules may be standardized where possible with allowances made for variances in the rules of different jurisdictions. As one example, the truckable modules 32, 46 may be approximately 20 meters (m) in length, 6 m in width, and 4 m in height. In some embodiments, the modules described herein (e.g., modules 32, 46) have a size equal to or less than an intermodal standardized shipping container. However, it may be understood that these dimensions and sizes may vary. It may also be understood that the size of the modules (e.g., modules 32, 46) are typically developed around the process system, and component sizes housed within the given module.

In some embodiments, the site 11 of direct reduction system 10 may be at a location reachable via avenues other than roads. For example, site 11 may be at an on-shore location reachable by a ship allowing for the water-transport of heat recovery modules 32 and reformer modules 46. In such an instance, depending upon the requirements of direct reduction system 10, a plurality of heat recovery modules 32 and/or a plurality of reformer modules 46 may be pre-assembled/pre-connected with each other (e.g., connected in series and/or parallel with each other at a remote facility) prior to being transported to the site 11 of system 10 (e.g., transported on a ship to the site 11). The plurality of pre-assembled heat recovery modules 32 and/or plurality of pre-assembled reformer modules 46 may be referred to herein as a heat recovery very large module (VLM) and a reformer VLM. In some embodiments, a plurality of heat recovery VLMs and/or a plurality of reformer VLMs may be transported to the site 11. Following transport to the site 11, the plurality of heat recovery VLMs and/or plurality of reformer VLMs are assembled together at the site 11 to form the heat recovery system 30 and reformer system 40, respectively. As an example, a plurality of heat recovery VLMs (each comprising a plurality of pre-assembled heat recovery modules 32) are connected in series and/or parallel together at the site 11 to form the heat recovery system 30 of direct reduction system 10.

It may be understood that the ability to transport VLMs to the site 11 (e.g., heat recovery VLMs and/or reformer VLMs described above) is contingent upon the degree of access afforded by the site 11. However, the ability to pre-assemble multiple heat recovery modules 32 and reformer modules 46 to form heat recovery VLMs and reformer VLMs, respectively, off-site may further reduce the capital costs associated with forming heat recovery system 30 and reformer system 40 given that it may be easier and more convenient to assemble the modules 32, 46 together off-site at a specialized facility than in the field at site 11 where such conveniences are not provided.

While only the modularity of the heat recovery system 30 and reformer system 40 are discussed above, it may be understood that additional systems and/or components of direct reduction system 10 may be modularized whereby the selected systems and/or components are formed from one or more generic modules such that the capabilities of the systems and/or components are determined by the number of modules forming the given system and/or component, and not by specifically tailoring the given system and/or component through on-site fabrication at site 11. As an example, furnace system 50 may be modularized whereby, for example, the shaft furnace 51 is broken down into one or more furnace modules which are individually fabricated off-site and later transported to site 11 to be assembled into the shaft furnace 51 of furnace system 50. As another example, the exhaust system 70 may be modularized whereby the exhaust stack 72 is formed from one or more exhaust stack modules which are separately and individually fabricated off-site and later transported to the site 11, and where the number of exhaust stack modules forming the exhaust stack 72 is dependent on the desired output capacity of direct reduction system 10. As another example, the feed transport system 20 and product transport system 60 may also be modularized such that each system is at least partially formed from a plurality of separate, transportable modules. Additionally, accessory systems such as a system for producing HBI, a dust reclamation system, etc., may also be modularized and formed from one or more separate, transportable modules.

Figure 2:
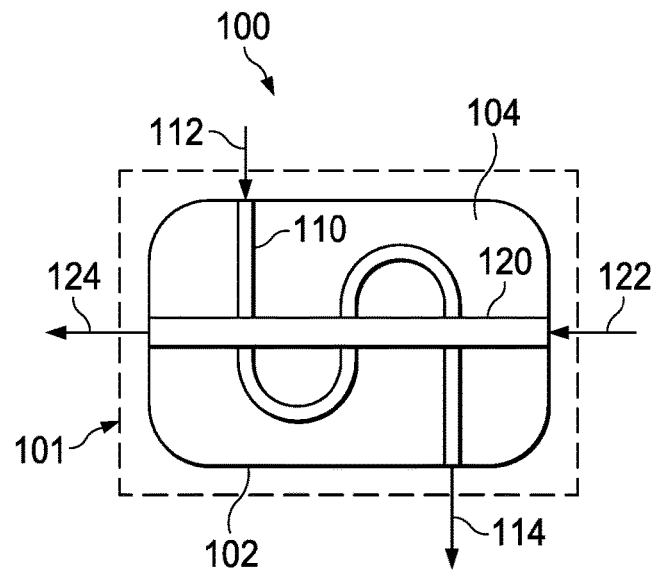
FIG. 2 is a schematic illustration of an embodiment of a reformer module.

Referring now to FIG. 2, an embodiment of a heat recovery module 100 is shown. Although labeled differently, the one or more heat recovery modules 32 shown in FIG. 1 may each, in some embodiments, be similarly configured as the heat recovery module 100 shown in FIG. 2. In this exemplary embodiment, heat recovery module 100 generally includes an external support structure 101, a vessel 102, a first fluid conduit 110, and a second fluid conduit 120. In some embodiments, the heat recovery module 100 may include a plurality of the first fluid conduits 110 and/or second fluid conduits 120. It may also be understood that in other embodiments heat recovery module 100 may include features in addition to those shown in FIG. 2.

External support structure 101 of heat recovery module 100 physically supports the components of heat recovery module 100 including, for example, vessel 102. Support structure 101 may also assist in the handling and transportation of heat recovery module 100 as module 100 is transported to the site of a direct reduction system (e.g., site 11 of system 10) and installed at the site. In some embodiments, support structure 101 comprises a skid or similar support frame; however, it may be understood that the configuration of support structure 101 may vary. External support structure 101 may allow for the stacking (structure 101 may include lifting points to allow for the attachment of structure 101 to a crane) and/or other arrangements of heat recovery modules 100 as desired based on the given application.

The vessel 102 of heat recovery module 100 defines an enclosed, internal chamber 104. The first fluid conduit 110 extends through the internal chamber 104 of vessel 102 and includes an inlet which receives a flow of feed gas 112, and an outlet which discharges a flow of pre-heated feed gas 114. The feed gas 112 may be used to form a reducing gas and may be similar to the feed gas 12 shown in FIG. 1 and may be mixed with an exhaust gas such as exhaust gas 52 shown in FIG. 1. The second fluid conduit 120 also extends through the internal chamber 104 of vessel 102 and includes an inlet which receives a flow of flue gas 122, and an outlet which discharges a flow of cooled flue gas 122. The flue gas 122 may be supplied from a reformer system or module such as the flue gas 42 shown in FIG. 1.

Heat from the flow of flue gas 112 flowing through second fluid conduit 120 is transferred to the feed gas 112 flowing through first fluid conduit 110 to thereby pre-heat the feed gas 112. In some embodiments heat recovery module 100 may include second fluid conduit 120 and instead the flue gas may simply enter the vessel 102 via an inlet port of the vessel 102, flow freely through the internal chamber 104 of vessel 102, contacting an exterior of the first fluid conduit 110, and exit the vessel 102 via a discharge port of the vessel 102.

Figure 3:
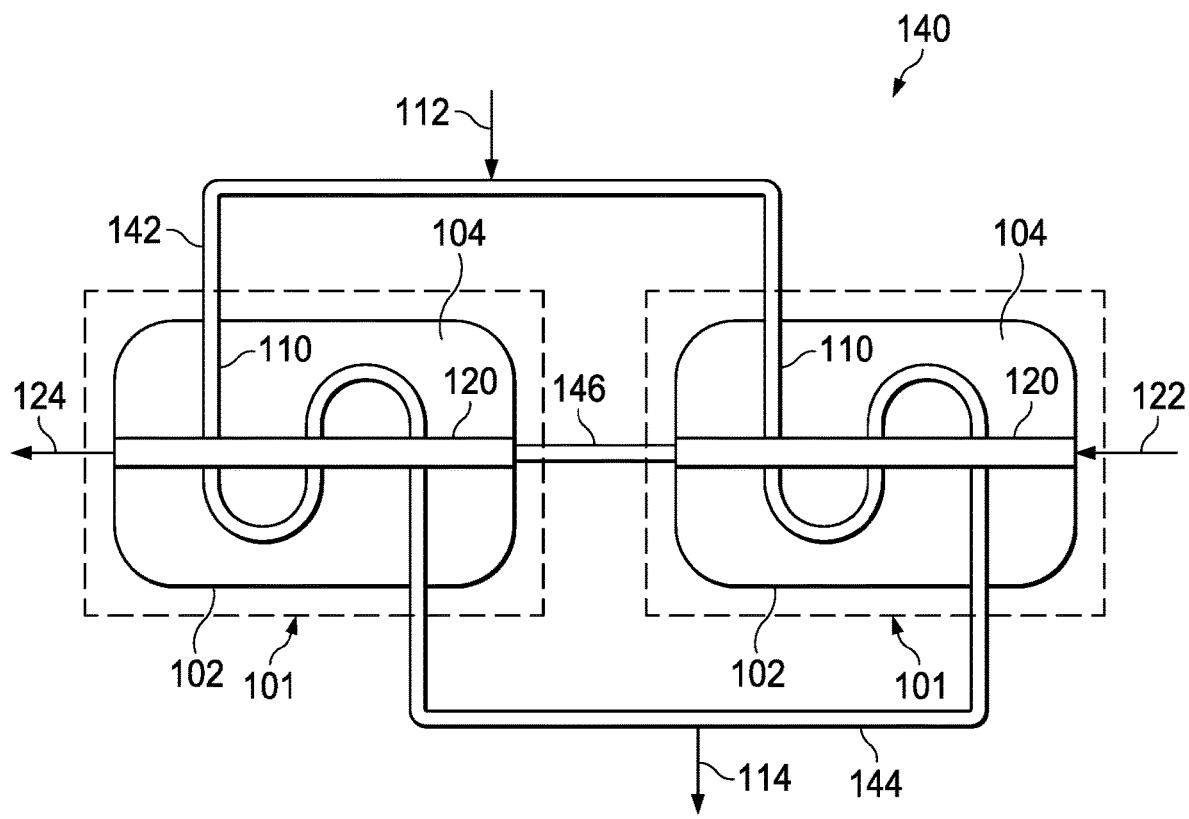
FIG. 3 is a schematic illustration of an embodiment of a reformer very large module including a plurality of the reformer modules of FIG. 2.

Referring to FIG. 3, an example of a heat recovery VLM 140 is shown which includes two of the heat recovery modules 100. It may be understood that while the heat recovery VLM 140 of FIG. 3 includes a pair of heat recovery modules 100, in other embodiments, the heat recovery VLM 140 may include more than two heat recovery modules 100 depending on, among other things, the accessibility of the site of the direct reduction system at which the heat recovery VLM 140 will be installed.

In this exemplary embodiment, heat recovery VLM 140 includes a feed header 142, a discharge header or manifold 144, and an interconnecting fluid pipe or conduit 146. Heat recovery VLM 140 may also include additional structural support members (not shown) which physically connect the support structures 101 of the pair of heat recovery modules 100. The feed header 142 divides the flow of feed gas 112 between the pair of heat recovery modules 100 while the discharge header 144 combines the discharged pre-heated feed gas flows from the pair of heat recovery modules 100 into a single flow of pre-heated feed gas 114. Additionally, the interconnecting fluid conduit 146 supplies one of the pair of heat recovery modules 100 with flue gas discharged from the other of the pair of heat recovery modules 100 and which is ultimately discharged from the heat recovery VLM 140 as cooled flue gas 124. Alternatively, heat recovery VLM 140 may include a flue gas header or manifold which divides a flow of flue gas 122 between the pair of heat recovery modules 100 such that the modules 100 are supplied with the flue gas 122 in parallel rather than in series as is shown in FIG. 3.

Figure 4:
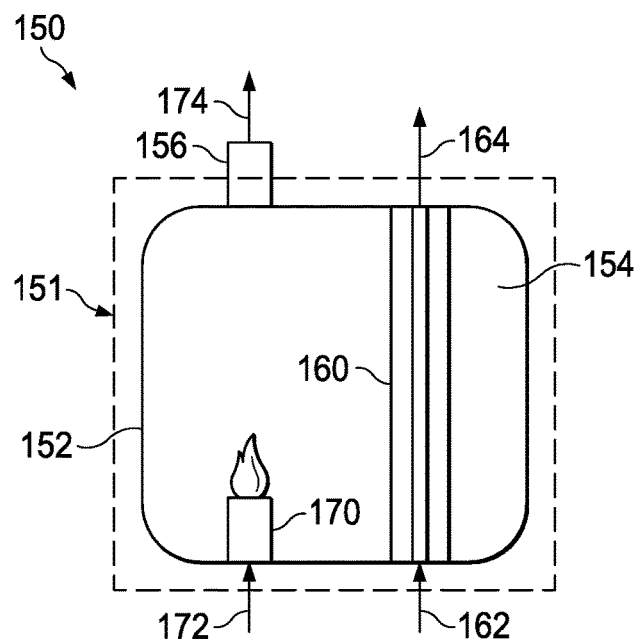
FIG. 4 is a schematic illustration of an embodiment of a heat recovery module.

Referring now to FIG. 4, an embodiment of a reformer module 150 is shown. Although labeled differently, the one or more reformer modules 46 shown in FIG. 1 may each, in some embodiments, be similarly configured as the reformer module 150 shown in FIG. 4. In this exemplary embodiment, recovery module 100 generally includes an external support structure 151, a reformer vessel 152, a fluid conduit or reactor tube 160, and a burner 170. In some embodiments, reformer module 150 includes a plurality of the reactor tubes 160 and/or burners 170. It may also be understood that in other embodiments reformer module 150 may include features in addition to those shown in FIG. 4.

External support structure 151 of reformer module 150 physically supports the components of reformer module 150 including, for example, reformer vessel 152. Support structure 151 may also assist in the handling and transportation of reformer module 150 as module 150 is transported to the site of a direct reduction system (e.g., site 11 of system 10) and installed at the site. In some embodiments, support structure 151 comprises a skid or similar support frame; however, it may be understood that the configuration of support structure 151 may vary.

The reformer vessel 152 of reformer module 150 defines an enclosed, internal chamber 154 and includes a discharge port 156 in fluid communication with internal chamber 154. Reactor tube 160 extends through internal chamber 154 of reformer vessel 152 and may be filled with a catalyst. Reactor tube 160 includes an inlet which receives a flow of pre-heated feed gas 162 which may be similar to, or the same as, pre-heated feed gas 14 shown in FIG. 1 and/or pre-heated feed gas 162 shown in FIGS. 2, 3. Reactor tube 160 additionally includes an outlet which discharges a flow of reducing gas 164 which may be similar to, or the same as, reducing gas 16 shown in FIG. 1. Burner 170 receives a flow of fuel gas 172 which may be similar to, or the same as, the fuel gas 54 shown in FIG. 1. Burner 170 ignites the fuel gas 172 within the internal chamber 154 of reformer vessel 152 to heat the pre-heated feed gas 162 entering reactor tube 160 and thereby assist in the formation of reducing gas 164 from pre-heated feed gas 162. Flue gas generated by the ignition of the fuel gas 172 by burner 170 is discharged from reformer vessel 152 through the discharge port 156 as a flue gas 174 which may be supplied to a heat recovery system or module such as the heat recovery modules 30, 100 shown in FIGS. 1 and 2, respectively.

Figure 5:
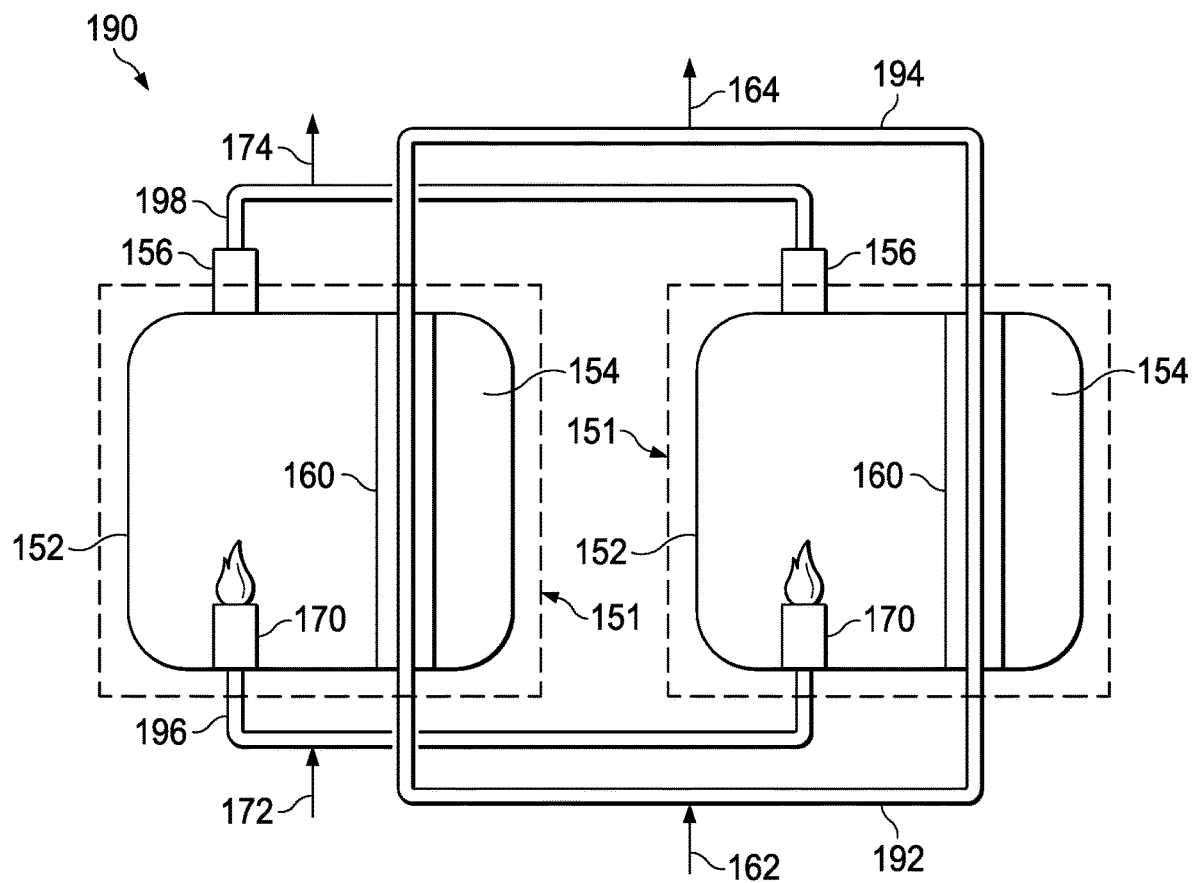
FIG. 5 is a schematic illustration of an embodiment of a heat recovery very large module including a plurality of the heat recovery modules of FIG. 4.

Referring to FIG. 5, an example of a reformer VLM 190 is shown which includes two of the reformer modules 150. It may be understood that while the reformer VLM 190 of FIG. 5 includes a pair of reformer modules 150, in other embodiments, the reformer VLM 190 may include more than two reformer modules 150 depending on, among other things, the accessibility of the site of the direct reduction system at which the reformer VLM 190 will be installed.

In this exemplary embodiment, reformer VLM 190 includes a feed gas inlet header or manifold 192, a feed gas discharge header or manifold 194, a fuel gas header or manifold 196, and a flue gas header or manifold 198. VLM 190 may also include additional structural support members (not shown) which physically connect the support structures 151 of the pair of reformer modules 150. The feed gas inlet header 192 divides the flow of pre-heated feed gas 162 between the pair of reformer modules 150 while the feed gas discharge header 194 combines the discharged reducing gas flows from the pair of reformer modules 150 into a single reducing gas 164. Additionally, the fuel gas header 196 divides the flow of fuel gas 172 between the pair of reformer modules 150 while the flue gas header 198 combines the discharged flue gas flows from the pair of reformer modules 150 into a single flue gas 174.

Figure 6:
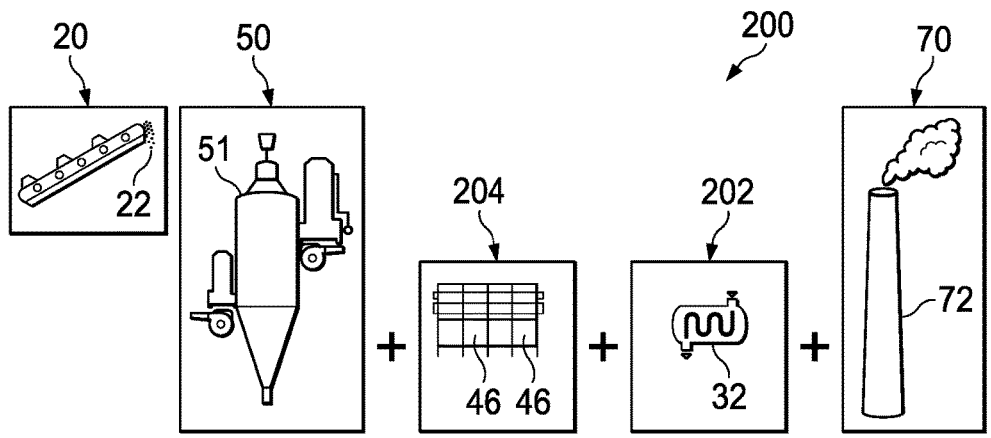
FIGS. 6-8 are schematic illustrations of other embodiments of direct reduction systems.
Figure 7:
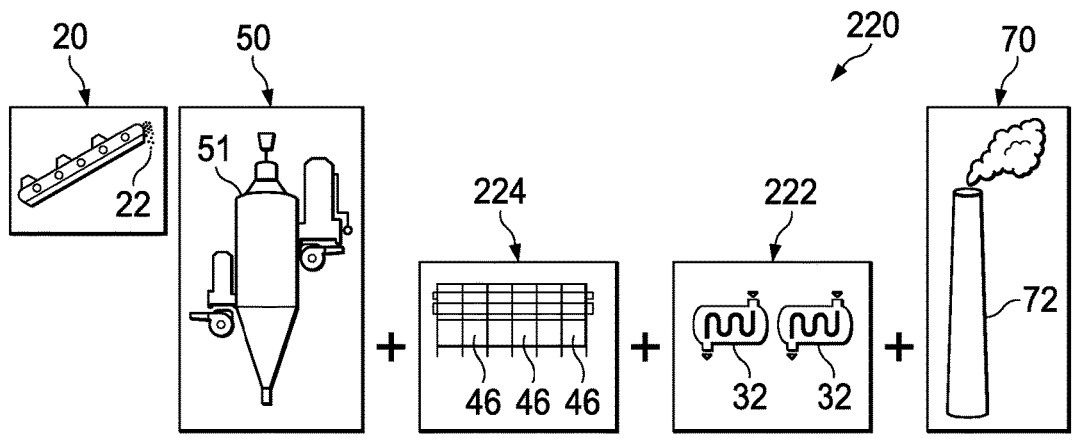
Figure 8:
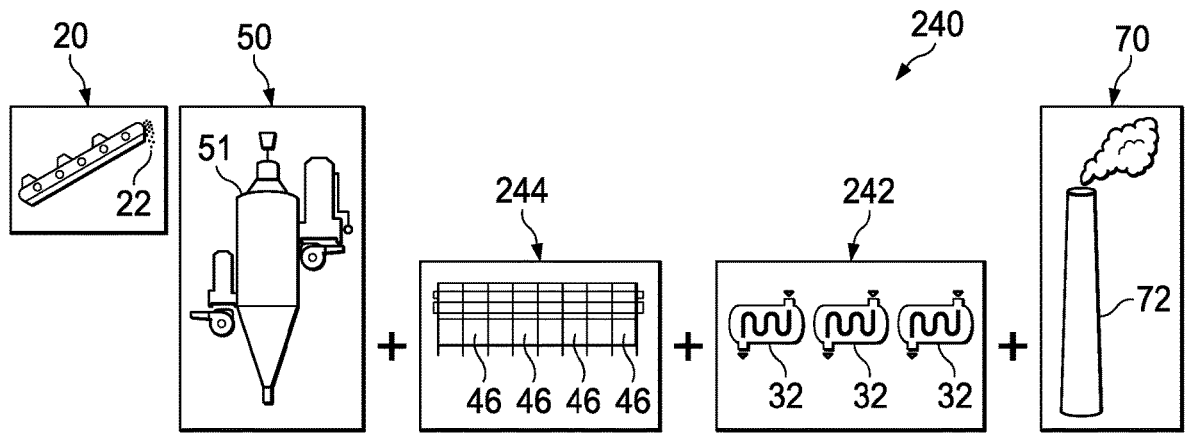

Referring now to FIGS. 6-8, different embodiments of direct reduction systems 200, 220, and 240 are shown, respectively, each formed from similarly configured modules. Particularly, as described above, the output capacity of a given direct reduction system as measured in Mtpy of DRI 80 may be adjusted by adjusting, for example, the number of heat recovery modules 32 and/or reformer modules 46 of the given direct reduction system. As an example, direct reduction system 200 (shown only schematically in FIG. 6) has a first output capacity, direct reduction system 220 (shown only schematically in FIG. 7) has a second output capacity which is greater than the first output capacity, and direct reduction system 240 (shown only schematically in FIG. 8) has a third output capacity which is greater than the second output capacity. For example, the first output capacity may be between approximately 0.5 Mtpy and 1.0 Mtpy of DRI 80, the second output capacity may be between approximately 1.4 Mtpy and 1.9 Mtpy of DRI 80, and the third output capacity may be between approximately 2.0 Mtpy and 2.5 Mtpy of DRI 80.

In this exemplary embodiment, the direct reduction system 200 includes a heat recovery system 202 having a single heat recovery module 32 and a reformer system 204 having a pair of reformer modules 46 connected together. In this example, the single heat recovery module 32 and pair of reformer modules 46 of direct reduction system 200 are sufficient to provide system 200 with the first output capacity, but insufficient to provide system 200 with either the second output capacity or third output capacity. Additionally, in this exemplary embodiment, the direct reduction system 220 includes a heat recovery system 222 having a pair of heat recovery modules 32 connected together and a reformer system 224 having three reformer modules 46 connected together. In this example, the pair of heat recovery modules 32 and three reformer modules 46 of direct reduction system 220 are sufficient to provide system 220 with the second output capacity (and more than sufficient to provide system 220 with the first output capacity), but insufficient to provide system 220 with either the third output capacity. Further, in this exemplary embodiment, the direct reduction system 240 includes a heat recovery system 242 having three heat recovery modules 32 connected together, and a reformer system 244 having four reformer modules 46 connected together. In this example, the three heat recovery modules 32 and four reformer modules 46 of direct reduction system 240 are sufficient to provide system 224 with the third output capacity, and more than sufficient to provide system 240 with either the first output capacity or the second output capacity.

Figure 9:
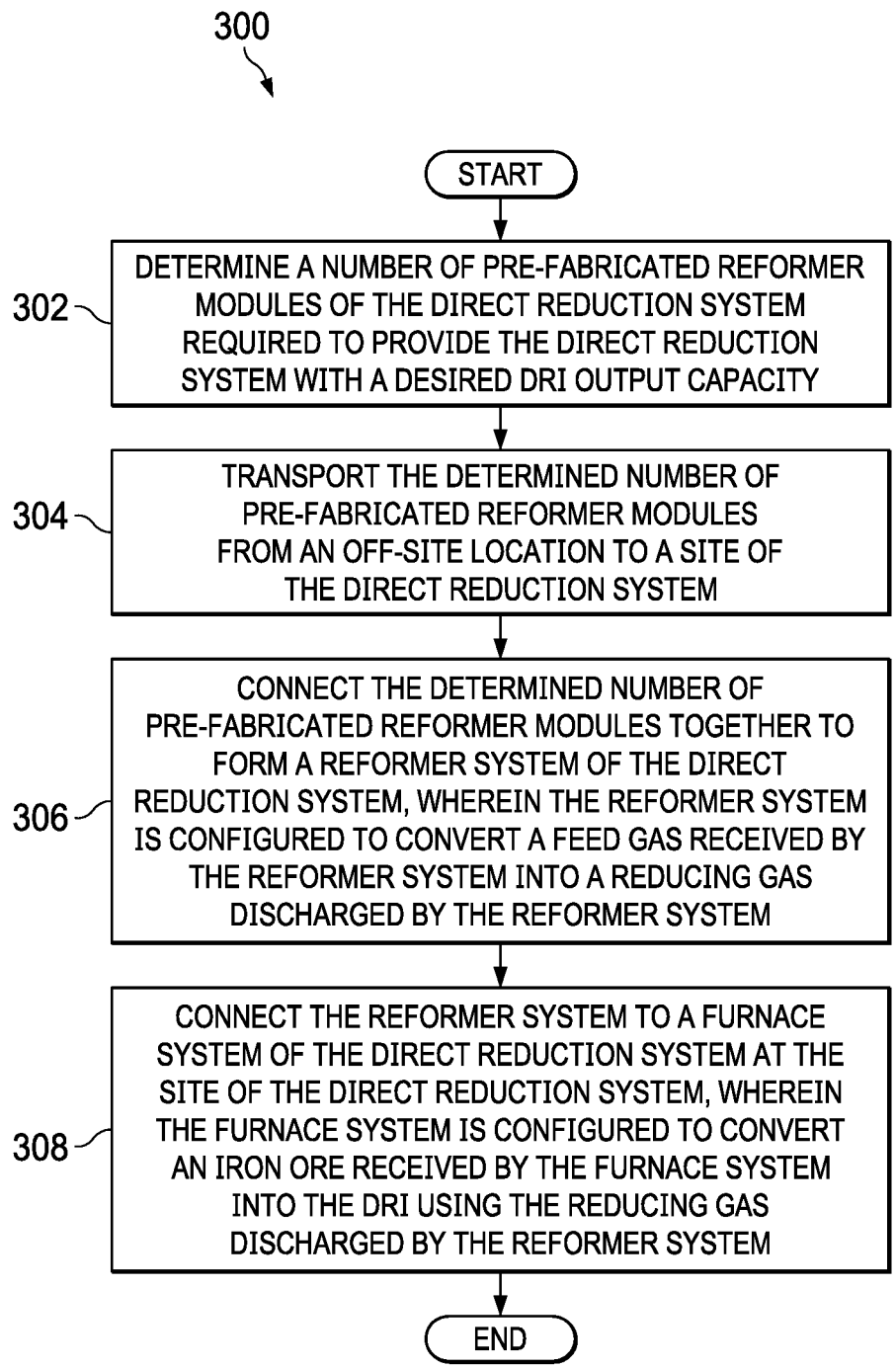
FIGS. 9-10 are flowcharts of embodiments of methods for providing a modularized direct reduction system.

Referring to FIG. 9, an embodiment of a method 300 for providing a modularized direct reduction system is shown. In this exemplary embodiment, method 300 begins at block 302 which includes determining a number of pre-fabricated reformer modules of the direct reduction system required to provide the direct reduction system with a desired DRI output capacity. In some embodiments, block 302 includes determining a number of reformer modules 46 (shown in FIG. 1), and/or a number of reformer modules 150 (shown in FIG. 4) required to provide the direct reduction system (e.g., direct reduction system 10 shown in FIG. 1) with a desired DRI output capacity. For example, the desired DRI output capacity may be a desired, predefined capacity (or capacity range or band) of DRI measured in units of Mtpy. As described above, the output capacity of a given direct reduction system may vary, at least in part, by the number of reformer modules 46/150 included in the system, where an increase in the number of reformer modules 46/150 may permit (along with other changes to the system), an increase in the output capacity of the direct reduction system.

Block 304 of method 300 includes transporting the determined number of pre-fabricated reformer modules from an off-site location to a site of the direct reduction system. In some embodiments, block 304 includes transporting a determined number of pre-fabricated reformer modules 46 and/or 150 from an off-site location to a site of the direct reduction system such as, for example, the site 11 of direct reduction system 10. As an example, a pre-fabricated reformer module 150 may be fabricated prior to transportation such that the pre-fabricated reformer module 150 includes a fabricated and assembled support structure 151 and reformer vessel 152 including reactor tube 160 and burner 170.

Block 306 of method 300 includes connecting the determined number of pre-fabricated reformer modules together to form a reformer system of the direct reduction system, wherein the reformer system is configured to convert a feed gas received by the reformer system into a reducing gas discharged by the reformer system. In some embodiments, block 306 includes connecting together the desired number of pre-fabricated reformer modules 46/150. For example, the reformer modules 46, and/or 150 may be fluidically connected in series and/or in parallel via one or more headers or manifolds such that a feed gas flowpath extends to each of the reformer modules 46/150 and a reducing gas flowpath extends from each of the reformer modules 46/150.

Block 308 of method 300 includes connecting the reformer system to a furnace system of the direct reduction system at the site of the direct reduction system, wherein the furnace system is configured to convert an iron ore received by the furnace system into the DRI using the reducing gas discharged by the reformer system. In some embodiments, block 308 includes connecting the reformer system 40 shown in FIG. 1 to the furnace system 50 of the direct reduction system 10 at the site 11 of system 10 as shown in FIG. 1. As described above, furnace system 50 is configured to convert iron ore 22 into DRI 80 using reducing gas 16 discharged by reformer system 40.

It may be understood that method 300 may include additional steps not included in the description of method 300 provided above. For example, in some embodiments, method 300 also includes determining a number of heat recovery modules required to provide the direct reduction system with the desired DRI output capacity, and transporting the desired number of pre-fabricated heat recovery modules from an off-site location (e.g., the same off-site location or a different location from which the pre-fabricated reformer modules are transported) to the site of the direct reduction system 10.

Figure 10:
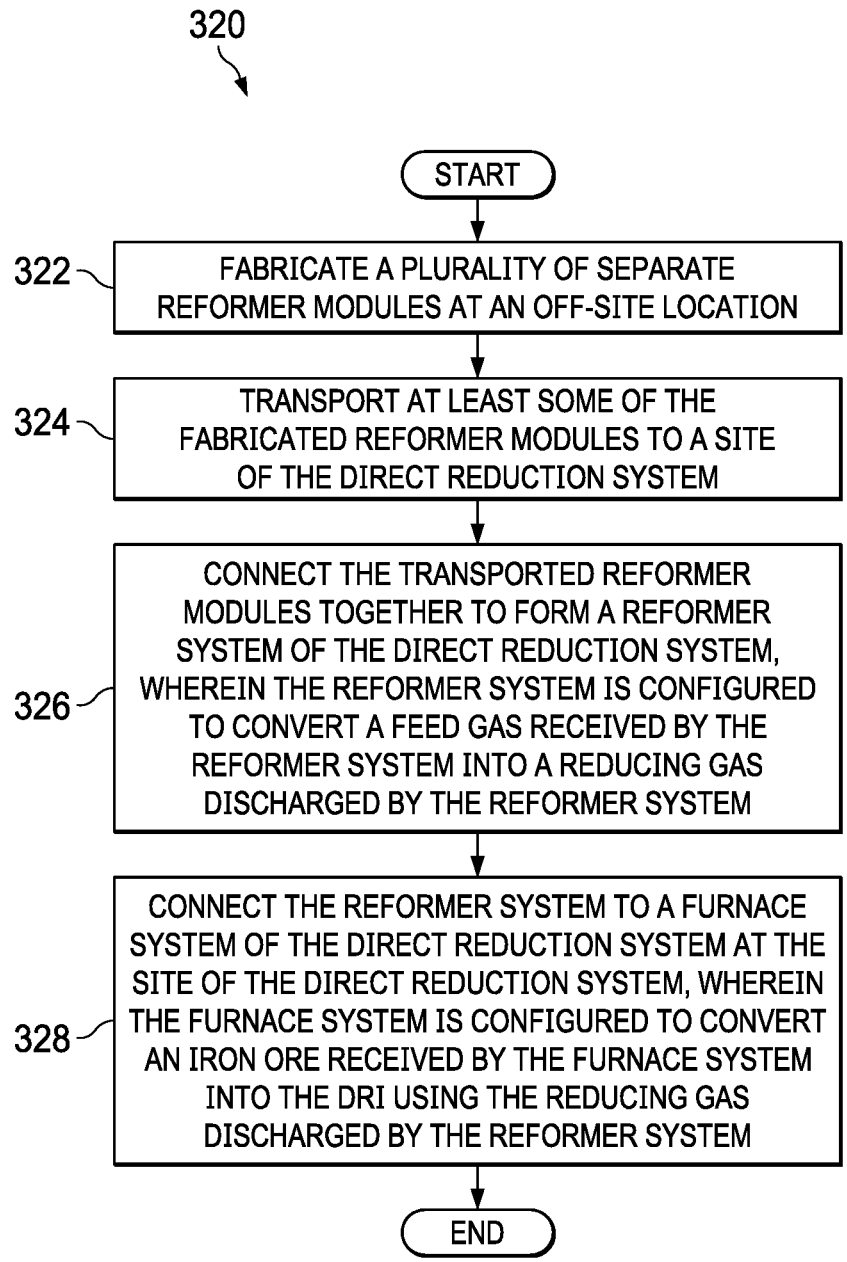

Referring to FIG. 10, an embodiment of a method 320 is shown for providing a direct reduction system is shown. In this exemplary embodiment, method 320 begins at block 322 which includes fabricating a plurality of separate reformer modules at an off-site location. In some embodiments, block 322 includes fabricating a plurality of separate reformer modules 46 (shown in FIG. 1) and/or reformer modules 150 (shown in FIG. 4) at an off-site location. For example, block 322 may include providing each of a plurality of reformer modules 150 at the off-site location with support structure 151 and reformer vessel 152 including the reactor tube 160 and burner 170.

Block 324 of method 320 includes transporting at least some of the fabricated reformer modules to a site of the direct reduction system. In some embodiments, block 324 comprises transporting at least some of the fabricated reformer modules 46 and/or reformer modules 150 to the site 11 of the direct reduction system 10 shown in FIG. 1. For example, the reformer modules 46 and/or reformer modules 150 may be road-transported via one or more trucks, water-transported via one or more vessels or ships, or rail-transported via one or more trains. Block 326 of method 320 includes connecting the transported reformer modules together to form a reformer system of the direct reduction system, wherein the reformer system is configured to convert a feed gas received by the reformer system into a reducing gas discharged by the reformer system. In some embodiments, block 326 comprises connecting the transported reformer modules 46/150 together to form the reformer system 40 shown in FIG. 1. For example, the reformer modules 46, and/or 150 may be fluidically connected in series and/or in parallel via one or more headers or manifolds.

Block 328 of method 320 includes connecting the reformer system to a furnace system of the direct reduction system at the site of the direct reduction system, wherein the furnace system is configured to convert an iron ore received by the furnace system into the DRI using the reducing gas discharged by the reformer system. In some embodiments, block 328 comprises connecting the reformer system 40 shown in FIG. 1 to the furnace system 50 of the direct reduction system 10 at the site 11 of system 10 as shown in FIG. 1. As described above, furnace system 50 is configured to convert iron ore 22 into DRI 80 using reducing gas 16 discharged by reformer system 40.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A modular direct reduction system for producing direct reduced iron (DRI), the system comprising:
   a reformer system which receives a flow of feed gas along a feed gas flowpath and which discharges a flow of reducing gas along a reducing gas flowpath, the reformer system comprising a plurality of separate reformer modules connected together and wherein each reformer module comprises:
   a reformer vessel comprising an internal chamber;
   a reactor tube extending through the internal chamber of the reformer vessel and containing a catalyst configured to react with the feed gas received by the reactor tube to form the reducing gas; and
   a burner which receives a flow of fuel gas along a fuel gas flowpath and is configured to burn the fuel gas to heat the reactor tube;
   a furnace system connected to the reformer system and comprising a furnace having a first inlet which receives an iron ore, a second inlet which receives the reducing gas from the reformer system to react with the iron ore and form the DRI, and an outlet which discharges the DRI.

2. The system of claim 1, wherein each of the plurality of separate reformer modules are truckable.

3. The system of claim 1, wherein each of the plurality of separate reformer modules has a size equal to or less than an intermodal standardized shipping container.

4. The system of claim 1, further comprising:
a feed gas header connected to each of the plurality of separate reformer modules, wherein the feed gas flowpath extends through the feed gas header; and
a reducing gas header connected to each of the plurality of separate reformer modules, wherein the reducing gas flowpath extends through the reducing gas header.

5. The system of claim 1, wherein:
the feed gas comprises a pre-heated feed gas and the feed gas flowpath comprises a pre-heated feed gas flowpath; and
the system further comprises:
a heat recovery system which receives a flow of raw feed gas along a raw feed gas flowpath and which discharges a flow of the pre-heated feed gas along the pre-heated feed gas flowpath, the heat recovery system comprising a plurality of separate heat recovery modules connected together and wherein each heat recovery module comprises:
a heat recovery vessel comprising an internal chamber;
a first fluid conduit extending through the internal chamber of the heat recovery vessel, wherein the first fluid conduit receives the flow of raw feed gas and discharges the flow of pre-heated feed gas; and
a second fluid conduit extending through the internal chamber of the heat recovery vessel, wherein the second fluid conduit receives a flow of flue gas from the reformer system to heat the raw feed gas received by the first fluid conduit.

6. The system of claim 5, wherein each of the plurality of separate heat recovery modules are truckable.

7. The system of claim 5, wherein each of the plurality of separate heat recovery modules has a size equal to or less than an intermodal standardized shipping container.

8. The system of claim 5, further comprising:
a raw feed gas header connected to each of the plurality of separate heat recovery modules, wherein a raw feed gas flowpath extends through the raw feed gas header; and
a pre-heated feed gas header connected to each of the plurality of separate heat recovery modules, wherein a pre-heated feed gas flowpath extends through the pre-heated feed gas header.

9. A method for providing a direct reduction system to produce direct reduced iron (DRI), the method comprising:
(a) determining a number of pre-fabricated reformer modules of the direct reduction system required to provide the direct reduction system with a desired DRI output capacity;
(b) transporting the determined number of pre-fabricated reformer modules from an off-site location to a site of the direct reduction system;
(c) connecting the determined number of pre-fabricated reformer modules together to form a reformer system of the direct reduction system, wherein the reformer system is configured to convert a feed gas received by the reformer system into a reducing gas discharged by the reformer system; and
(d) connecting the reformer system to a furnace system of the direct reduction system at the site of the direct reduction system, wherein the furnace system is configured to convert an iron ore received by the furnace system into the DRI using the reducing gas discharged by the reformer system.

10. The method of claim 9, wherein (b) comprises road-transporting the determined number of pre-fabricated reformer modules to the site of the direct reduction system.

11. The method of claim 9, wherein (b) comprises water-transporting the determined number of pre-fabricated reformer modules to the site of the direct reduction system.

12. The method of claim 9, wherein each of the pre-fabricated reformer modules comprises:
a vessel comprising an internal chamber;
a reactor tube extending through the internal chamber of the vessel and containing a catalyst configured to react with the feed gas received by the reactor tube to form the reducing gas; and
a burner which receives a flow of fuel gas along a fuel gas flowpath and is configured to burn the fuel gas to heat the reactor tube.

13. The method of claim 9, wherein at least some of the determined number of pre-fabricated reformer modules are connected together to form a reformer very large module (VLM) prior to transporting the reformer VLM to the site of the direct reduction system.

14. The method of claim 9, further comprising:
(e) determining a number of pre-fabricated heat recovery modules of the direct reduction system required to provide the direct reduction system with the desired DRI output capacity;
(f) transporting the determined number of pre-fabricated heat recovery modules to the site of the direct reduction system; and
(g) connecting the determined number of pre-fabricated heat recovery modules together to form a heat recovery system of the direct reduction system, wherein the heat recovery system is configured to heat the feed gas using a flue gas discharged by the reformer system before the feed gas is received by the reformer system.

15. The method of claim 14, wherein (f) comprises road-transporting the determined number of pre-fabricated heat recovery modules to the site of the direct reduction system.

16. The method of claim 14, wherein each of the pre-fabricated reformer modules comprises:
a heat recovery vessel comprising an internal chamber;
a first fluid conduit extending through the internal chamber of the heat recovery vessel, wherein the first fluid conduit receives the feed gas heated by the heat recovery module; and
a second fluid conduit extending through the internal chamber of the heat recovery vessel, wherein the second fluid conduit receives a flue gas from the reformer system to heat the feed gas received by the first fluid conduit.

17. A method for providing a direct reduction system to produce direct reduced iron (DRI), the method comprising:
(a) fabricating a plurality of separate reformer modules at an off-site location, each of the plurality of separate reformer modules comprising:
a vessel comprising an internal chamber;

a reactor tube extending through the internal chamber of the vessel and containing a catalyst configured to react with a feed gas received by the reactor tube to form a reducing gas; and a burner which receives a flow of fuel gas along a fuel gas flowpath and is configured to burn the fuel gas to heat the reactor tube;

(b) transporting at least some of the fabricated reformer modules to a site of the direct reduction system;

(c) connecting the transported reformer modules together to form a reformer system of the direct reduction system, wherein the reformer system is configured to convert a feed gas received by the reformer system into a reducing gas discharged by the reformer system; and (d) connecting the reformer system to a furnace system of the direct reduction system at the site of the direct reduction system, wherein the furnace system is configured to convert an iron ore received by the furnace system into the DRI using the reducing gas discharged by the reformer system.

18. The method of claim 17, further comprising:

(e) determining a number of the reformer modules of the direct reduction system required to provide the direct reduction system with a desired DRI output capacity;

wherein the number of reformer modules transported to the site of the direct reduction system is equal to the number of reformer modules determined at (e).

19. The method of claim 17, further comprising:

(e) fabricating a plurality of separate heat recovery modules at an off-site location, each of the plurality of separate heat recovery modules comprising:

a heat recovery vessel comprising an internal chamber;

a first fluid conduit extending through the internal chamber of the heat recovery vessel, wherein the first fluid conduit receives the feed gas heated by the heat recovery module; and a second fluid conduit extending through the internal chamber of the heat recovery vessel, wherein the second fluid conduit receives a flue gas from the reformer system to heat the feed gas received by the first fluid conduit;

(f) transporting at least some of the fabricated heat recovery modules to the site of the direct reduction system; and (g) connecting a heat recovery system comprising the plurality of separate heat recovery modules to the reformer system of the direct reduction system at the site of the direct reduction system, wherein the heat recovery system heats the feed gas received by the reformer system using a flue gas discharged by the reformer system.

20. The method of claim 17, further comprising:

(h) determining a number of the heat recovery modules of the direct reduction system required to provide the direct reduction system with a desired DRI output capacity;

wherein the number of heat recovery modules transported to the site of the direct reduction system is equal to the number of heat recovery modules determined at (h).

* * * * *